Figure 1:
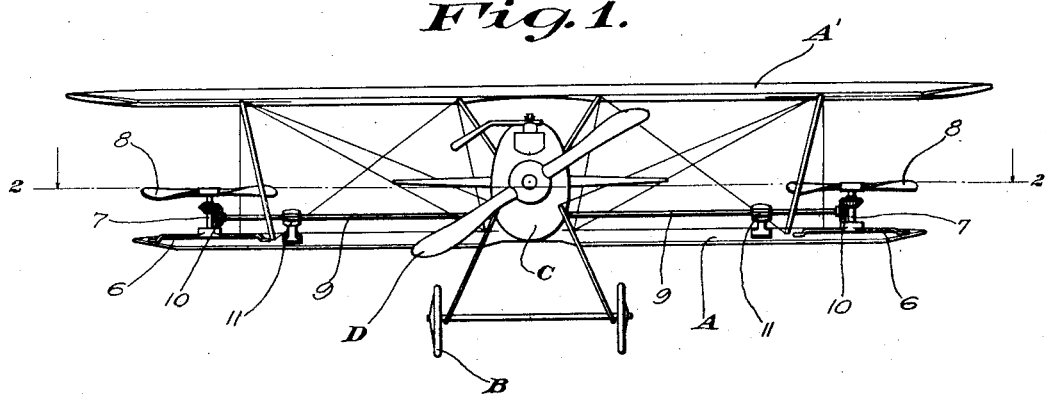

J. F. CRANCE.
LANDING AND LAUNCHING DEVICE.
APPLICATION FILED OCT. 2, 1919.

1,361,751.

Patented Dec. 7, 1920.

WITNESSES

INVENTOR
John F. Crance
BY
ATTORNEYS

UNITED STATES PATENT OFFICE.

JOHN FORESTER CRANCE, OF PETERSBURG, NEW YORK.

LANDING AND LAUNCHING DEVICE.

1,361,751.       Specification of Letters Patent.     Patented Dec. 7, 1920.

Application filed October 2, 1919. Serial No. 327,841.

*To all whom it may concern:*

Be it known that I, JOHN F. CRANCE, a citizen of the United States, and a resident of Petersburg, in the county of Rensselaer and State of New York, have invented a new and Improved Landing and Launching Device, of which the following is a full, clear, and exact description.

This invention relates to an improved landing and launching device for air vehicles, particularly airplanes of the monoplane or biplane type.

The primary object of the invention is to provide means whereby an air vehicle may be launched in a comparatively restricted area, that is to say, making it unnecessary for the vehicle to traverse a long distance with a gradual ascent. The same advantages are gained in landing the vehicle, in that the device may be used to facilitate bringing the vehicle to earth in a small running space and without the danger of damage.

Referring to the drawings which illustrate the preferred embodiment of the invention, the device is shown for the purpose of illustration, as applied to an air vehicle of the biplane type.

In the drawings—

Figure 2:
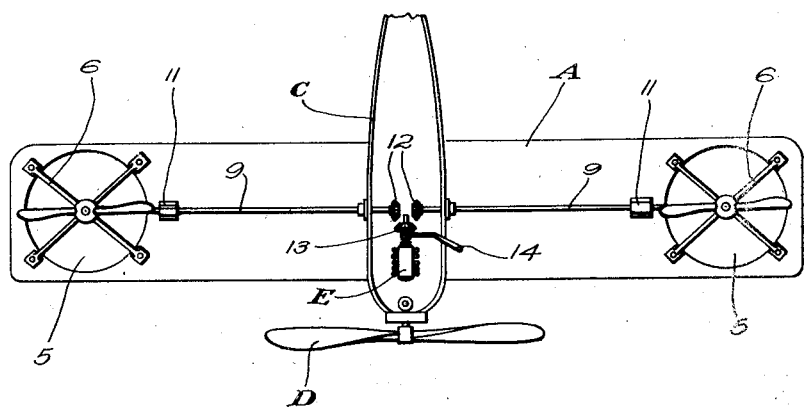

Figure 1 is a front elevation of a conventional type of biplane, as shown in the application of the present invention, and Fig. 2 is a top plan view of the lower wing of the biplane with the improved device associated therewith.

A and A' represent the lower and top wings of the convention type of biplane; B, the landing chassis; C, the fuselage, and D, the propeller, which is driven by the engine E.

According to the preferred form of the present invention, one of the wings, either A or A', but preferably the lower one A, is cut away to provide relatively large openings 5, one at each of its outer ends, over which a spider-supporting means 6 is located to provide a mounting for the jack shafts 7 of the propellers 8. The wing is cut away as at 5, to prevent air pockets being formed around the propellers by the wing A deflecting the air away from the vicinity of the propellers.

Disposed parallel with the wing A are the driving shafts 9, one of which being located on each side of the axis of drive for the vehicle, and connected in driving relation with the propellers 8 through the bevel gears 10. Suitable journal bearings 11 are provided on the wing to support the shaft with freedom of rotation. The opposite ends of the shafts are each provided with bevel gears 12, which are adapted to mesh with a sliding gear 13 on the end of the motor shaft, a suitable lever 14 being provided for manipulating the gear into and out of driving relation with the gears 12. The axes of the propellers 8 are at right angles to the axis of drive of the shafts 9. Therefore, when the shafts are connected in driving relation with the motor, the propellers 8 will be caused to induce a lifting effect of the vehicle, the effect being greatly facilitated by the cut-away portions of the wing, leaving unobstructed air passages through the wing.

In realizing the advantages of the construction contemplated by the invention, at the time of launching, the pilot will manipulate the lever 14 to connect the shafts 9 in driving relation with the motor, whereupon the propellers may be brought into action, thus enabling the machine to rise without the customary gradual climb.

In landing, the device may again be brought into use, only in this instance will act more or less as a brake or retarder and permit the machine to be landed in a relatively restricted space.

I claim:

The combination with an aeroplane having upper and lower wings and a fuselage; of a pair of horizontal shafts journaled upon the lower wings and extending in proximity to the outer ends thereof and substantially parallel therewith, bearings on said wings supporting said shafts for rotation, the lower wings having openings therethrough, spider-supporting means arranged upon the lower planes over the openings, shafts journaled in said supporting means and geared to the outer ends of the first-named shafts, horizontal propellers carried by the upper ends of the second-named shafts and spaced above the lower wings and located between the wings, a prime mover carried by the fuselage, and means to connect the prime mover with the inner ends of the first named shafts at will, the openings formed by cutting away the wings beneath the propellers serving to prevent the air banking against the lower wings beneath the propellers.

JOHN FORESTER CRANCE.